United States Patent
Allen, Jr. et al.

(10) Patent No.: US 6,175,556 B1
(45) Date of Patent: Jan. 16, 2001

(54) REMOTE POWERED ETHERNET REPEATER

(75) Inventors: James Johnson Allen, Jr.; Ronald Julius Cooper, both of Raleigh, NC (US)

(73) Assignee: International Business Machines Corporation, Armonk, NY (US)

(*) Notice: Under 35 U.S.C. 154(b), the term of this patent shall be extended for 0 days.

(21) Appl. No.: 08/779,726

(22) Filed: Jan. 6, 1997

Related U.S. Application Data

(63) Continuation of application No. 08/254,383, filed on Jun. 6, 1994, now abandoned.

(51) Int. Cl.[7] ........................................ H04J 3/02
(52) U.S. Cl. ................... 370/293; 370/453; 370/457; 370/463; 370/501; 375/211; 375/257; 340/538; 379/348; 379/413; 395/750.01
(58) Field of Search ................... 370/293, 445, 370/463, 501, 502, 453, 457; 170/70 R; 379/296, 338, 344, 348, 413; 340/538, 310 A, 825.05, 425.1, 425.2; 375/211, 212, 214, 219, 220, 257, 377; 395/750, 200.1; 307/146

(56) References Cited

U.S. PATENT DOCUMENTS

| | | | |
|---|---|---|---|
| 3,835,334 | * 9/1974 | Notteau | 379/348 |
| 4,241,243 | * 12/1980 | Ball | 340/425.2 |
| 4,475,209 | * 10/1984 | Udren | 375/214 |
| 4,837,788 | * 6/1989 | Bird | 375/220 |
| 4,839,886 | * 6/1989 | Wu | 375/212 |
| 5,051,720 | * 9/1991 | Kittirutsunetorn | 379/66 |
| 5,081,646 | * 1/1992 | Faunce | 375/214 |
| 5,164,960 | * 11/1992 | Wincn et al. | 375/224 |
| 5,181,240 | * 1/1993 | Sakuragi et al. | 379/413 |
| 5,224,154 | * 6/1993 | Aldridge et al. | 375/220 |
| 5,276,443 | * 1/1994 | Gates et al. | 375/257 |
| 5,313,642 | * 5/1994 | Seigel | 395/750 |
| 5,347,549 | * 9/1994 | Baumann et al. | 375/369 |
| 5,396,495 | * 3/1995 | Moorwood et al. | 370/97 |
| 5,404,544 | * 4/1995 | Crayford | 395/750 |
| 5,444,856 | * 8/1995 | Bowers et al. | 395/200.1 |
| 5,467,384 | * 11/1995 | Skinner, Jr. | 379/66 |
| 5,528,089 | * 6/1996 | Guiset et al. | 307/146 |
| 5,548,614 | * 8/1996 | Stoll et al. | 375/220 |

OTHER PUBLICATIONS

ISO/IEC 8802–3: 1993(E) ANSI/IEEE Std. 802.3, 1993 Edition, pp. 87–89, 108–110, 115–121, 165–172, 245–256.*

* cited by examiner

Primary Examiner—Douglas W. Olms
Assistant Examiner—Shick Hom
(74) Attorney, Agent, or Firm—Joscelyn G. Cockburn

(57) ABSTRACT

A system and method for remotely powering an Ethernet network repeater through an attachment unit interface (AUI) between the repeater and a remote personal computer ("PC") or workstation. The AUI includes logic circuitry to detect when the Ethernet is supporting a transmit signal and a receive signal. Associated with the AUI is a DC to DC converter which receives, remotely through the AUI interface, a DC voltage from the PC or workstation and converts the DC voltage into working voltages for the remote repeater.

6 Claims, 4 Drawing Sheets

REMOTE POWERED ETHERNET REPEATER

This application is a continuation of application Ser. No. 08/254,383 filed on Jun. 6, 1994, which was abandoned upon the filing hereof.

BACKGROUND OF THE INVENTION

The fundamental job of a local area network ("LAN") is to physically link several personal computers ("PCs") or workstations to each other, and often to a mainframe or a minicomputer. This is accomplished with a variety of materials--twisted-wire cables, fiber optics, phone lines, and, even, infrared light and radio signals.

One common network configuration is Ethernet, which is a LAN developed by Xerox in 1976, originally for linking minicomputers at the Palo Alto Research Center. Ethernet is a widely implemented network from which the IEEE 802.3 standard for contention networks was developed. Ethernet utilizes a bus topology (configuration) and relies on the form of access known as CSMA/CD (an acronym for Carrier Sense Multiple Access with Collision Detection, which is a network protocol for handling situations in which two or more nodes (stations) transmit at the same time, thus causing a collision) to regulate traffic on the main communication line (bus). Network nodes, or workstations, are typically connected by coaxial cable (in either of two varieties, known as thick and thin) or by twisted-pair wiring. Thin Ethernet cabling is 5 millimeters (about 0.2 inch) in diameter and can connect network stations over a distance of 185 meters (about 600 feet); thick Ethernet cabling is one centimeter (about 0.4 inch) in diameter and can connect stations up to 500 meters (about 1640 feet) apart.

However, with the proliferation of networks within today's business and technology communities and organizations, the above limitations on distances between workstations within a network, such as Ethernet, has become a hinderance to their growth and implementation. The solution has been the implementation of network repeaters, which essentially "amplify" or regenerate the signals transmitted on the communication bus so that nodes or workstations can be located greater distances from each other. Naturally, these repeaters require some sort of power source in order to accomplish their function.

Presently, such repeaters are implemented as either stand-alone repeaters or repeater adapters. A stand-alone repeater, or hub as it is sometimes referred to, has its own power supply and can be located anywhere there is a power outlet. However, such a stand-alone repeater may be located within a wiring closet or some other remotely accessible location within a building, or between buildings, where a power source is not readily available. The result is that power has to be wired to the location of the repeater, which can be burdensome and expensive. An adapter repeater is typically installed within a PC or workstation, thus eliminating the need for a separate power supply. A limitation of the adapter repeater is that the PC or workstation may become congested due to multiple connections to other workstations.

Thus, there is a need in the art for a stand-alone network repeater, which may be provided power from a remote location. There is a further need in the art for an Ethernet repeater that may be remotely powered.

SUMMARY OF THE INVENTION

Thus, it is an object of the present invention to provide a remote powered repeater for a LAN, such as within an Ethernet LAN.

In the attainment of the above object, the present invention, in a preferred embodiment, utilizes power transmitted from a remote source, such as a remotely coupled workstation or PC. By using this remotely supplied power, the present invention creates a stand-alone repeater without a power supply. This reduces the cost and complexity of the repeater and gives the repeater flexibility since it can be located away from a PC or workstation, and no power outlet is required.

Essentially, an attachment unit interface ("AUI") is utilized to couple a remote workstation to the repeater. The interface is configured so that voltage from the workstation is provided to the repeater. In addition to providing power, the AUI also couples the remote workstation to the network bus.

Within the repeater, the supplied voltage is delivered to a DC to DC converter, which then supplies the various components within the repeater with appropriate converted voltage levels. A noise filter may also be implemented along with the DC to DC converter to suppress any noise entering the repeater through the AUI.

In order for the workstation to be coupled to the network, the AUI from the workstation must interface with the repeater controller. This interfacing may be accomplished by coupling the AUI to the AUI port or the inter-repeater bus of the repeater controller through discreet logic circuitry.

In a further alternative embodiment of the present invention, the repeater may be implemented as a managed repeater by adding a Network Interface Controller ("NIC"), which may be an application specific integrated circuit ("ASIC").

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

The following discussion is with reference to an Ethernet network. However, the concepts of the present invention may be useful within another network topology or configuration requiring network repeaters.

Figure 1:
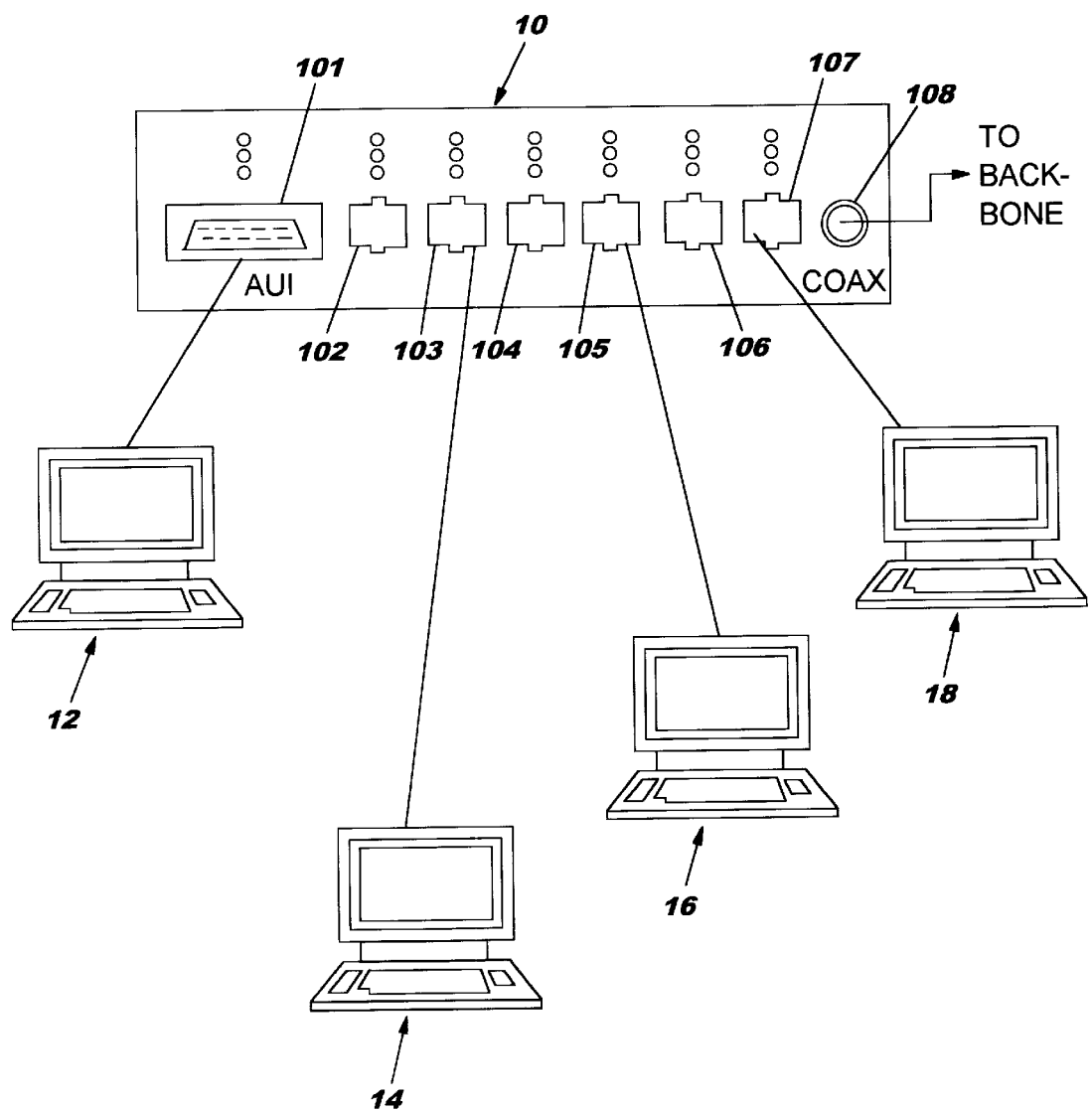
FIG. 1 illustrates a repeater utilized within a network.

Referring to FIG. 1, there is illustrated Ethernet repeater 10 coupled through coax connector 108 to a network bus, or backbone. Repeater 10 operates to couple workstations 12, 14, 16, 18 to the network bus.

The various components utilized within Ethernet repeater 10 require power for their operation. This power has traditionally been provided by a power supply that is an integral part of repeater 10, or by a small power supply located coextensively with repeater 10.

To provide remote power to repeater 10, a preferred embodiment of the present invention utilizes a feature provided through utilization of the AUI of an Ethernet adapter implemented within a PC or workstation in order to couple it to the Ethernet network. Two examples of Ethernet adapters implemented within a PC or workstation are (1) LAN Adapter for Ethernet, IBM part no. 48G7169 and (2) LAN Adapter/A for Ethernet, IBM part no. 48G7171. The AUI in an Ethernet adapter provides up to 500 milliamps at +12 volts.

Typically, for a workstation to be coupled to an Ethernet network, an Ethernet adapter with an AUI is required to be installed within the workstation so that it may couple to a medium attachment unit ("MAU"), which provides a means for coupling a workstation to an Ethernet network. The MAU operates in part to provide a "collision" signal to the workstation upon the occurrence of the workstation attempting to transmit data at the same time as another workstation within the network. Further, an MAU is also utilized to couple an Ethernet repeater to the network. Again, the MAU provides in part a "collision" signal to the repeater so that it may pass this signal on to the appropriate workstation coupled to the repeater.

Within FIG. 1, workstation 12 is coupled to repeater 10 through AUI 101. As stated above, workstation 12 will be required to implement an AUI adapter for coupling with repeater 10. Workstations 14, 16 and 18, which are supplied with 10BaseT adapters, are connected in a typical manner to repeater 10, through 10BaseT ports 103, 105 and 107, respectively. Coax (coaxial) port 108 (10Base2 port) is coupled in a typical manner to the backbone of the Ethernet network. Alternatively, coax port 108 may be coupled to a coax-equipped workstation.

An AUI is an interface within a LAN between the MAU and the data terminal equipment ("DTE") within a data station. The AUI carries encoded control and data signals between the DTE's physical signaling ("PLS") sublayer and the MAU's physical medium attachment ("PMA") sublayer and provides for duplex data transmission. In a LAN, the MAU is a device used in a data station to couple the DTE to the transmission medium. For further discussions on the AUI, the MAU and the 10BaseT, 10Base2 and 10Base5 interfaces, please refer to the standards set forth in ISO/IEC 8802–3: 1993(E) ANSI/IEEE Std. 802.3, 1993 Edition, pages 87–89, 108–110, 115–121, 165–172, 245–256, which is hereby incorporated by reference herein.

As defined within the IEEE standard 802.3, AUI 101 transfers a voltage supplied by workstation 12, which is normally used by an MAU, for use by repeater 10. Thus, repeater 10 may be located remotely from workstation 12. This distance is limited only by the maximum length of the AUI cable coupling workstation 12 to repeater 10, as determined by the IEEE standard 802.3.

Figure 2:
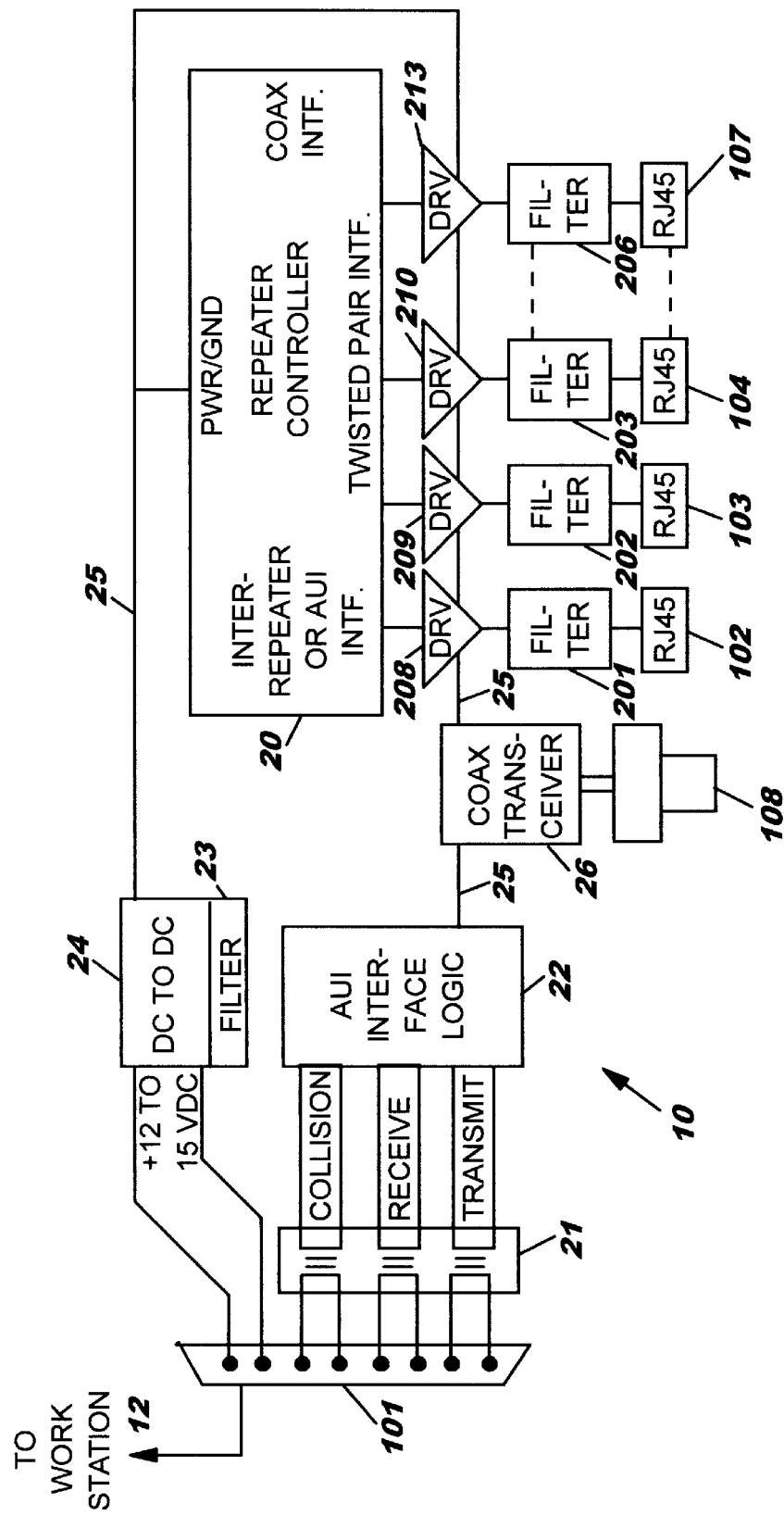
FIG. 2 illustrates a remote powered repeater in accordance with the present invention.

Referring next to FIG. 2, there is illustrated an implementation of the present invention to supply power to repeater 10. Repeater 10 includes repeater controller 20, which may be a custom ASIC chip, or it could be one of several typical repeater controllers offered by the industry. Repeater controller 20 provides the functions as defined in the IEEE standard for 10BaseT repeaters. Typically, repeater controller 20 may offer four to twelve 10BaseT ports, a 10Base5 interface for AUI support, and a coax media interface (10Base2) for support of a backbone connection, as illustrated in FIG. 1.

In an alternative embodiment not shown herein, an inter-repeater bus may permit a plurality of repeaters 10 to be cascaded to perform as a single repeater. In other words, this feature would allow two 6-port repeaters to be connected by a flat cable to form a 12-port repeater.

AUI 101 transfers a +12 to 15 volts DC received from workstation 12 to DC to DC converter 24, which provides various appropriate voltages (e.g., +5v) in a well-known manner within repeater 10 via power bus 25. Filter 23 may be utilized along with DC to DC converter 24 to filter for noise immunity.

In order for workstation 12 to be coupled to the Ethernet network, AUI 101 must interface with repeater controller 20. This interfacing is accomplished with coupling AUI 101 to the AUI port, or the inter-repeater bus, of repeater controller 20 through discreet logic circuitry within AUI logic 22. A person skilled in the art has the capability to design such logic circuitry.

Figure 3:
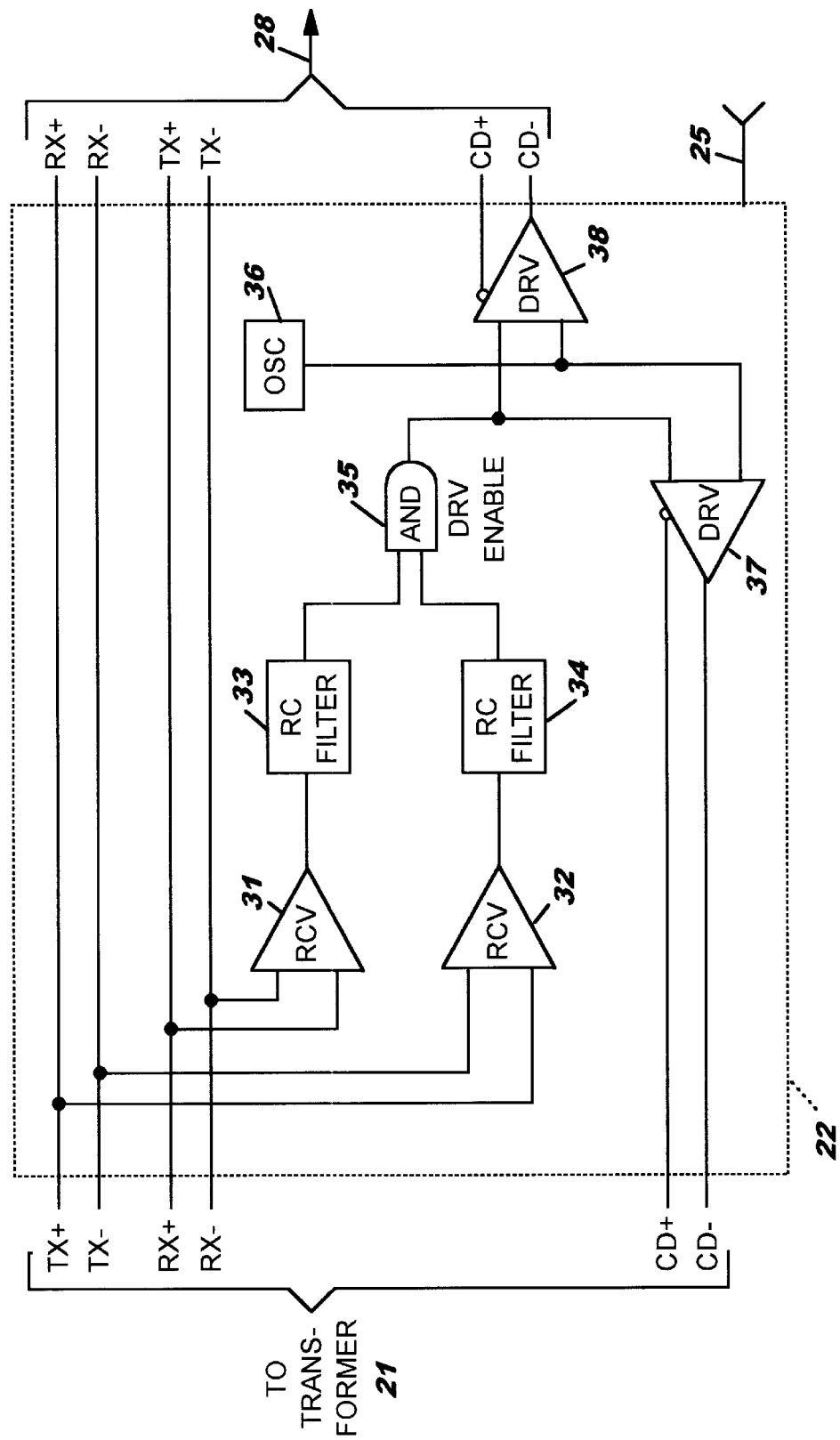
FIGS. 3 and 4 illustrate examples of two embodiments of AUI interface logic circuitry 22 illustrated in FIG. 2.

Referring to FIG. 3, there is illustrated an example of logic circuitry for AUI logic 22, wherein TX+ and TX– represent a differential transmit signal, RX+ and RX– represent a differential receive signal, and CD+ and CD– represent a differential collision signal. All of the differential signals are comprised of square wave signals, transmitted through the LAN. The transmit signal pair being received from transformer 21 corresponds to the pair of lines labeled as "TRANSMIT" in FIG. 2, while the receive pair leading from interface 22 to transformer 21 in FIG. 3 corresponds to the lines labeled as "RECEIVE."

Emanating from logic 22, the transmit, receive and collision signal pairs are also placed on bus 28 (see FIG. 2), which is coupled to repeater controller 20, which couples these signals to the rest of the LAN. Note that bus 28 is also coupled to coax transceiver 26. A manual or software switch (not shown) may be coupled to bus 28 to switch data carried thereon from flowing between repeater controller 20 and transceiver 26, or between repeater controller 20 and interface logic 22.

Within interface logic 22, receive amplifiers 31 and 32 are coupled to the transmit and receive differential pair signal lines, respectively. Receive amplifiers 31 and 32 monitor the transmit and receive bus lines for data signals. Amplifiers 31 and 32, along with filters 33 and 34, operate to produce a respective constant, positive voltage level if a data signal is detected upon their associated bus line. The outputs of the filters are coupled to AND circuit 35. If only one of the above-mentioned bus lines is carrying data at any one particular moment, no signal will be transmitted from AND circuit 35. However, if data is being transmitted on both bus lines, a signal will be produced by AND circuit 35. This signal indicates that two workstations (one of the workstations being workstation 12) within the LAN are attempting to transmit data simultaneously.

Oscillator 36 provides an oscillating signal to drivers 37 and 38. Upon receiving the collision-indicating signal from AND circuit 35, drivers 37 and 38 will transmit the oscillating signal from oscillator 36 on the two collision signal lines to transformer 21 and repeater controller 20, respectively. The result of this operation is that interface logic 22 produces the collision signal typically required within an Ethernet.

Figure 4:
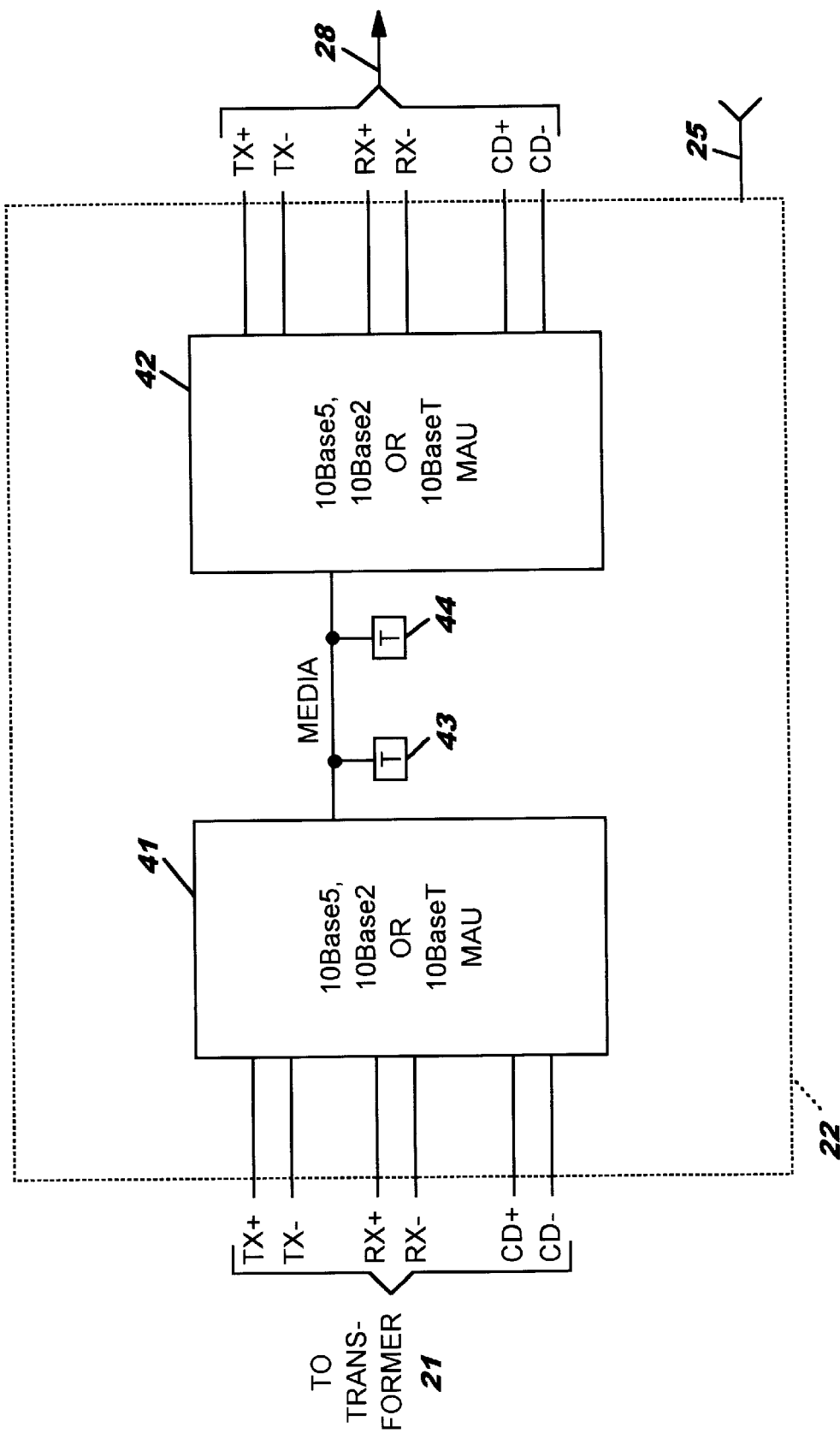

Referring next to FIG. 4, there is shown an alternative embodiment of AUI logic 22. Therein, the discreet logic illustrated in FIG. 3 is replaced by essentially a "small ethernet repeater system." The aforementioned transmit, receive and collision bus lines are received on both ends of interface 22 by either a 10Base2 or a 10BaseT MAU, noted by blocks 41 and 42. an example of a 10Base2 MAU presently available is Part No. DP8392C from National Semiconductor. Additionally, MAU's are described further in ISO/IEC 8802–3 referenced previously herein. MAUs 41 and 42 are coupled to each other within interface 22. This coupling is assisted by impedance matching circuits 43 and 44. As an example, a 50-ohm resistor might be utilized for circuits 43 and 44 if a 10Base2 MAU is incorporated, while a 100-ohm resistor would be utilized if 10BaseT MAUs are utilized.

If the AUI port on repeater controller 20 is utilized, logic is necessary since workstation 12 and repeater 10 both expect to detect a MAU device on AUI 101. This logic circuitry swaps the transmit and receipt pairs and adds logic circuitry to generate the collision pair for both workstation 12 and repeater control 20.

An alternative method for coupling workstation 12 to repeater controller 20 is to utilize the inter-repeater bus. This bus is repeater-device specific, but like the AUI port on repeater controller 20, it may be implemented quite easily with discreet logic in a well-known manner by one skilled in the art.

Note that coax connector 108 requires typical coax transceiver 26 for interfacing with repeater controller 20. Additionally, each 10BaseT port (RJ45 connectors 102–107) requires low pass filters 201–206, drivers 208–213, including isolation transformers plus passive components, for wave shaping and noise suppression.

Additionally, for isolation and noise suppression, transformers 21 are required between AUI 101 and interface logic 22.

Although the present invention and its advantages have been described in detail, it should be understood that various changes, substitutions and alterations can be made herein without departing from the spirit and scope of the invention as defined by the appended claims.

What is claimed is:

1. An Ethernet repeater comprising:

repeater controller that provides repeater functions;

coupler for coupling said repeater controller to data stations via an Ethernet bus, receiver adaptable for receiving all power required by said repeater directly from one of said data stations as said power is required; and circuit including, a DC to DC converter, for transferring said power from said receiver to said repeater controller, such that said Ethernet repeater is remotely powered by said one data station.

2. An Ethernet repeater comprising:

repeater controller that provides repeater functions;

coupler for coupling said repeater controller to data stations via an Ethernet bus;

receiver adaptable for receiving all power required by said repeater directly from one of said data stations as said power is required; and circuit, including a DC to DC converter and a noise filter coupled to said DC to DC converter, for transferring said power from said receiver to said repeater controller, such that said Ethernet repeater is remotely powered by said one data station.

3. A method for powering a computer network repeater, said method comprising the steps of:

transmitting all power required by said repeater from a remote workstation as said power is required;

receiving said power from said remote workstation;

converting said received power to appropriate voltages for components and transferring said power to said components within said repeater.

4. An Ethernet repeater comprising:

repeater controller that provides repeater functions;

coupler for coupling said repeater control to data stations via an Ethernet bus;, said coupler including a transformer including a first tap for connecting to collision signal conductors, a second tap for connecting to receiver signal conductors, and a third tap for connecting to transmit signal conductors;

a circuit arrangement including receiver logic, RC filter and a logical AND circuit operatively coupled to monitor signals on the receive signal conductors and the transmit signal conductors and output a collision signal if signals are sensed simultaneously on the receive signal conductors and the transmit signal conductor;

receiver adaptable for receiving all power required by said repeater directly from one of said data stations as said power is required; and circuit for transferring said power from said receiver to said repeater controller, such that said Ethernet repeater is remotely powered by said one data station.

5. An ethernet repeater including:

a repeater controller that provides repeater functions;

an attachment unit interface (AUI) including power terminals receiving all power required by said repeater directly from a remote data station as said power is required and signal terminals to transfer collision signals, receive signals and transmit signals;

a DC to DC converter coupling the power terminals to the repeater controller;

a transformer coupled to the signal terminals; and an AUI interface logic monitoring the receive signals and the transmit signals to generate the collision signals if the transmit signals and the receive signals are sensed simultaneously.

6. The ethernet repeater of claim 5 further including a filter circuit connected to the DC to DC converter.

* * * * *